F. E. ALLEN.
Ring-Gages for Jewelers.

No. 146,974.　　　　　　　　　　　Patented Feb. 3, 1874.

WITNESSES.　　　　　　Francis E. Allen
W. Abel　　　　　　　　By Boyd Eliot
W. H. Goodchild　　　　　atty for it
　　　　　　　　　　　　　INVENTOR.

UNITED STATES PATENT OFFICE.

FRANCIS E. ALLEN, OF KEENE, NEW HAMPSHIRE.

IMPROVEMENT IN RING-GAGES FOR JEWELERS.

Specification forming part of Letters Patent No. 146,974, dated February 3, 1874; application filed July 2, 1873.

*To all whom it may concern:*

Be it known that I, FRANCIS E. ALLEN, of Keene, in the county of Cheshire and State of New Hampshire, have invented certain Improvements in Ring-Gages for Jewelers, of which the following is a specification:

My invention consists of a ring-gage for indicating the inner circumference of finger-rings, and provided with an auxiliary gage or scale for measuring the length of material for forming any required size of ring, as will be hereinafter described.

Figure 1:
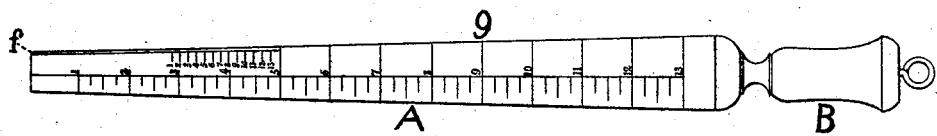
Figure 2:
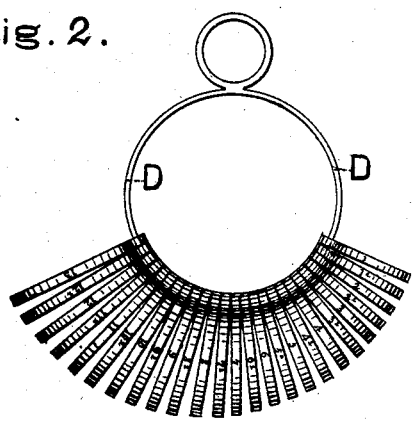
Figure 3:
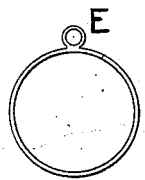

In the accompanying drawings, Figure 1 represents the ring-gage. Fig. 2 represents a collection of the gage-rings. Fig. 3 is an edge view of one of the gage-rings, showing the eye or loop by which it may be held in proper position with the others, so that it may be easily selected relatively with the others of the set.

The ring-gage, as shown at Fig. 1, is readily formed of sheet metal, as at A, in a conical shape, the largest end being of greater circumference than the largest ring desired to be measured; and the other end may terminate in a point, as the apex of the cone, but, preferably, at about the smallest size of rings to be measured, so that the gage proper will consist of the frustum of a cone, as here shown.

For convenience of handling, said metal cone may be mounted on a wooden handle, as at B, in the end of which is a loop or ring for suspending it in any convenient place, ready for use, if desired.

Upon said metal cone a scale is formed, of any desired number of parts, (here shown from 1 to 13, inclusive,) and with subdivisions of halves and quarters, so that the inner circumference of any ring greater than 1 and less than 13 may be accurately determined by trying it upon the ring-gage; and another ring of the same size may be readily selected to correspond therewith by also fitting it upon the gage, and thereby avoiding unnecessary handling of the rings, by which they are tarnished, injured, or lost.

If, however, it is desired to select a ring where the size of the finger is not known, then one of the gage-rings, as shown at Fig. 2, is to be used by trying it upon the finger, one after another being selected, until the proper size is ascertained, and then, by fitting it upon the ring-gage, the exact size is indicated, and a ring may then be selected that will fit without trying on more than one.

As shown in the drawings, the gage-rings may all be marked, so as to dispense with the necessity of using the ring-gage A to ascertain its size; but it will be found, in practice, best not to fit the gage-ring so tightly upon the finger as the finger-ring may be; consequently, the ring-gage will then indicate the exact size that may be worn upon the finger, by selecting one a little less than the gage-ring, as will be indicated by the scale upon the ring-gage.

For convenience of handling and preserving said gage-rings, they are suspended upon a ring or loop, as shown at D, Fig. 2; and each of said rings is also provided with a loop or eye, as at E, by which it is suspended to the ring D.

The third part of the invention is shown at F in Fig. 1, where a scale is shown from 1 to 13, and which is to show how long a piece of wire is to be cut to make a ring to correspond to any of said numbers on the ring-gage—as, for example, if a ring be required to fit the gage at 9, then the wire must be cut the length from the small end of the gage at *f* to figure 9 in the small scale.

What I claim is—

A ring-gage for indicating the inner circumference of finger-rings, and provided with an auxiliary gage or scale for measuring the length of material for forming any required size of ring, substantially as herein set forth.

FRANCIS E. ALLEN.

Witnesses:
R. H. PORTER,
HENRY COLONY,
O. G. NIMS.